US009652618B1

(12) United States Patent
Lerner

(10) Patent No.: US 9,652,618 B1
(45) Date of Patent: May 16, 2017

(54) SYSTEMS AND APPARATUSES FOR ARCHITECTURE ASSESSMENT AND POLICY ENFORCEMENT

(71) Applicant: Optum, Inc., Minnetonka, MN (US)

(72) Inventor: Phillip F Lerner, Melville, NY (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 15/179,581

(22) Filed: Jun. 10, 2016

(51) Int. Cl.
*G06F 21/57* (2013.01)
*G06N 99/00* (2010.01)

(52) U.S. Cl.
CPC ......... *G06F 21/577* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,029,175 A * | 2/2000 | Chow | ............... | G06F 17/30899 |
| 6,094,731 A * | 7/2000 | Waldin | .................. | G06F 21/564 |
| | | | | 714/2 |
| 6,393,486 B1 * | 5/2002 | Pelavin | ............... | H04L 41/0813 |
| | | | | 709/238 |
| 8,589,214 B1 * | 11/2013 | Scott | ...................... | G05B 17/02 |
| | | | | 705/7.28 |
| 2005/0005169 A1 * | 1/2005 | Kelekar | ............. | H04L 63/1408 |
| | | | | 726/4 |
| 2005/0228789 A1 * | 10/2005 | Fawcett | ............... | G06N 99/005 |
| 2006/0021046 A1 * | 1/2006 | Cook | .................. | H04L 63/1433 |
| | | | | 726/25 |
| 2006/0041808 A1 * | 2/2006 | Yamamura | ..... | G01R 31/318307 |
| | | | | 714/738 |
| 2007/0094491 A1 * | 4/2007 | Teo | ...................... | H04L 63/1408 |
| | | | | 713/153 |
| 2009/0187823 A1 * | 7/2009 | Farrell | ...................... | G06F 8/71 |
| | | | | 715/700 |
| 2009/0319588 A1 * | 12/2009 | Gandhi | ............... | G06F 21/6254 |
| 2012/0102542 A1 * | 4/2012 | Kobayashi | ......... | G06Q 10/0635 |
| | | | | 726/1 |
| 2013/0055398 A1 * | 2/2013 | Li | ......................... | G06F 21/577 |
| | | | | 726/25 |

(Continued)

*Primary Examiner* — Peter Poltorak
(74) *Attorney, Agent, or Firm* — Alston & Bird LLP

(57) ABSTRACT

Example embodiments are disclosed herein for asset architecture evaluation and security enforcement within an enterprise computing platform. One example method includes receiving a proposed architecture for evaluation, wherein the proposed architecture for evaluation relates to integration of an asset into the enterprise computing platform. This example method further includes dynamically evaluating, by risk evaluation circuitry, the proposed architecture against embedded security policies, standards, baselines, or patterns established for the enterprise computing platform. In addition, the example method includes, in an instance in which dynamic evaluation of the proposed architecture identifies security gaps, determining, by the risk evaluation circuitry, changes to the proposed architecture that would remediate the identified security gaps. The example method further includes generating a report regarding the proposed architecture, wherein the report identifies any changes to the proposed architecture that would remediate the identified security gaps. Corresponding apparatuses and computer program products are also provided.

15 Claims, 6 Drawing Sheets

(56) References Cited

U.S. PATENT DOCUMENTS

| | | | |
|---|---|---|---|
| 2013/0173327 A1* | 7/2013 | Lance | G06Q 10/06 705/7.23 |
| 2013/0276126 A1* | 10/2013 | Zhou | G06F 21/577 726/25 |
| 2014/0165203 A1* | 6/2014 | Friedrichs | G06F 21/56 726/24 |
| 2015/0040233 A1* | 2/2015 | Oliphant | H04L 63/1441 726/25 |
| 2015/0143335 A1* | 5/2015 | Jain | G06F 8/70 717/121 |
| 2015/0163121 A1* | 6/2015 | Mahaffey | G06F 11/0766 707/687 |
| 2015/0193709 A1* | 7/2015 | Ramesh Babu | G06Q 10/0637 705/7.28 |
| 2015/0324527 A1* | 11/2015 | Siegel | G06F 19/28 705/3 |

\* cited by examiner

SYSTEMS AND APPARATUSES FOR ARCHITECTURE ASSESSMENT AND POLICY ENFORCEMENT

TECHNOLOGICAL FIELD

Example embodiments of the present invention relate generally to information technology architecture and, more particularly, to systems, apparatuses, and methods for reducing security risk through automated assessment of applications and enforcement of security policies.

BACKGROUND

Applicant has discovered problems with existing techniques for evaluating security gaps created by assets interfacing with enterprise computing platforms. Through applied effort, ingenuity, and innovation, Applicant has solved many of these identified problems by developing a solution that is embodied by the present invention and described in detail below.

SUMMARY

Example embodiments described herein improve upon existing asset architecture assessment and security enforcement techniques. The embodiments described herein are directed to improvements in the technical character, ability, and efficiency of an enterprise computing platform.

In a first example embodiment, a method is provided for asset architecture evaluation and security enforcement within an enterprise computing platform. The method includes receiving a proposed architecture for evaluation, wherein the proposed architecture for evaluation relates to integration of an asset into the enterprise computing platform. The method further includes dynamically evaluating, by risk evaluation circuitry, the proposed architecture against embedded security policies, standards, baselines, or patterns established for the enterprise computing platform. The method further includes, in an instance in which dynamic evaluation of the proposed architecture identifies security gaps, determining, by the risk evaluation circuitry, changes to the proposed architecture that would remediate the identified security gaps. The method also includes generating a report regarding the proposed architecture, wherein the report identifies any changes to the proposed architecture that would remediate the identified security gaps.

In some embodiments, receiving the proposed architecture for evaluation includes causing transmission, by a component scanner, of one or more change identification messages to a component agent residing on the asset, and receiving an indication that there have been changes to an architecture of the asset from a version of the architecture of the asset that was previously evaluated by the security engine, wherein the proposed architecture comprises a current architecture of the asset.

In some such embodiments, receiving the indication that there have been changes to the architecture includes receiving an indication of an architecture of the asset; and comparing the architecture of the asset to the version of the architecture of the asset that was previously evaluated by the security engine. In this regard, the method may further include causing transmission, by the component scanner and to the component agent residing on the asset, of the report regarding the proposed architecture.

In some embodiments, the method further includes training one or more machine learning algorithms to develop one or more baselines or patterns for the enterprise computing platform. In some such embodiments, dynamically evaluating the proposed architecture includes evaluating, by the risk evaluation circuitry and using the one or more machine learning algorithms, whether any aspects of the proposed architecture violate the developed baselines or patterns for the enterprise computing platform.

In some embodiments, determining changes to the proposed architecture that would remediate the identified security gaps includes retrieving manual intervention identifying the changes to the proposed architecture that would remediate the identified security gaps, or identifying the changes to the proposed architecture that would remediate the identified security gaps using at least one of the embedded security policies, standards, baselines, or patterns established for the enterprise computing platform.

In another example embodiment, an apparatus is provided for asset architecture evaluation and security enforcement within an enterprise computing platform. The apparatus includes at least one processor and at least one memory storing computer-executable instructions, that, when executed by the at least one processor, cause the apparatus to receive a proposed architecture for evaluation, wherein the proposed architecture for evaluation relates to integration of an asset into the enterprise computing platform. The computer-executable instructions, when executed by the at least one processor, further cause the apparatus to dynamically evaluate the proposed architecture against embedded security policies, standards, baselines, or patterns established for the enterprise computing platform and, in an instance in which dynamic evaluation of the proposed architecture identifies security gaps, determine changes to the proposed architecture that would remediate the identified security gaps. The computer-executable instructions, when executed by the at least one processor, further cause the apparatus to generate a report regarding the proposed architecture, wherein the report identifies any changes to the proposed architecture that would remediate the identified security gaps.

In some embodiments, the computer-executable instructions, when executed by the at least one processor, causes the apparatus to receive the proposed architecture for evaluation by causing the apparatus to cause transmission, by a component scanner, of one or more change identification messages to a component agent residing on the asset, and receive an indication that there have been changes to an architecture of the asset from a version of the architecture of the asset that was previously evaluated by the security engine, wherein the proposed architecture comprises a current architecture of the asset.

In some such embodiments, the computer-executable instructions, when executed by the at least one processor, causes the apparatus to receive the indication that there have been changes to the architecture by causing the apparatus to receive an indication of an architecture of the asset, and compare the architecture of the asset to the version of the architecture of the asset that was previously evaluated by the security engine. In this regard, the computer-executable instructions, when executed by the at least one processor, further cause the apparatus to cause transmission, by the component scanner and to the component agent residing on the asset, of the report regarding the proposed architecture.

In some embodiments, the computer-executable instructions, when executed by the at least one processor, further cause the apparatus to train one or more machine learning algorithms to develop one or more baselines or patterns for the enterprise computing platform. In some such embodiments, the computer-executable instructions, when executed by the at least one processor, cause the apparatus to dynamically evaluate the proposed architecture by causing the apparatus to evaluate, using the one or more machine learning algorithms, whether any aspects of the proposed architecture violate the developed baselines or patterns for the enterprise computing platform.

In some embodiments, the computer-executable instructions, when executed by the at least one processor, cause the apparatus to determine changes to the proposed architecture that would remediate the identified security gaps by causing the apparatus to retrieve manual intervention identifying the changes to the proposed architecture that would remediate the identified security gaps, or identify the changes to the proposed architecture that would remediate the identified security gaps using at least one of the embedded security policies, standards, baselines, or patterns established for the enterprise computing platform.

In another example embodiment, an apparatus is provided for asset architecture evaluation and security enforcement within an enterprise computing platform. The apparatus includes means for receiving a proposed architecture for evaluation, wherein the proposed architecture for evaluation relates to integration of an asset into the enterprise computing platform, means for dynamically evaluating the proposed architecture against embedded security policies, standards, baselines, or patterns established for the enterprise computing platform, means for, in an instance in which dynamic evaluation of the proposed architecture identifies security gaps, determining changes to the proposed architecture that would remediate the identified security gaps, and means for generating a report regarding the proposed architecture, wherein the report identifies any changes to the proposed architecture that would remediate the identified security gaps.

In some embodiments, the means for receiving the proposed architecture for evaluation includes means for causing transmission, by a component scanner, of one or more change identification messages to a component agent residing on the asset; and means for receiving an indication that there have been changes to an architecture of the asset from a version of the architecture of the asset that was previously evaluated by the security engine, wherein the proposed architecture comprises a current architecture of the asset. In some such embodiments, the means for receiving the indication that there have been changes to the architecture includes means for receiving an indication of an architecture of the asset, and means for comparing the architecture of the asset to the version of the architecture of the asset that was previously evaluated by the security engine. In this regard, the apparatus further includes means for causing transmission, by the component scanner and to the component agent residing on the asset, of the report regarding the proposed architecture.

In some embodiments, the apparatus further includes means for training one or more machine learning algorithms to develop one or more baselines or patterns for the enterprise computing platform. In some such embodiments, the means for dynamically evaluating the proposed architecture includes means for evaluating, using the one or more machine learning algorithms, whether any aspects of the proposed architecture violate the developed baselines or patterns for the enterprise computing platform.

In some embodiments, the means for determining changes to the proposed architecture that would remediate the identified security gaps include means for retrieving manual intervention identifying the changes to the proposed architecture that would remediate the identified security gaps, or means for identifying the changes to the proposed architecture that would remediate the identified security gaps using at least one of the embedded security policies, standards, baselines, or patterns established for the enterprise computing platform.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale.

Figure 1:
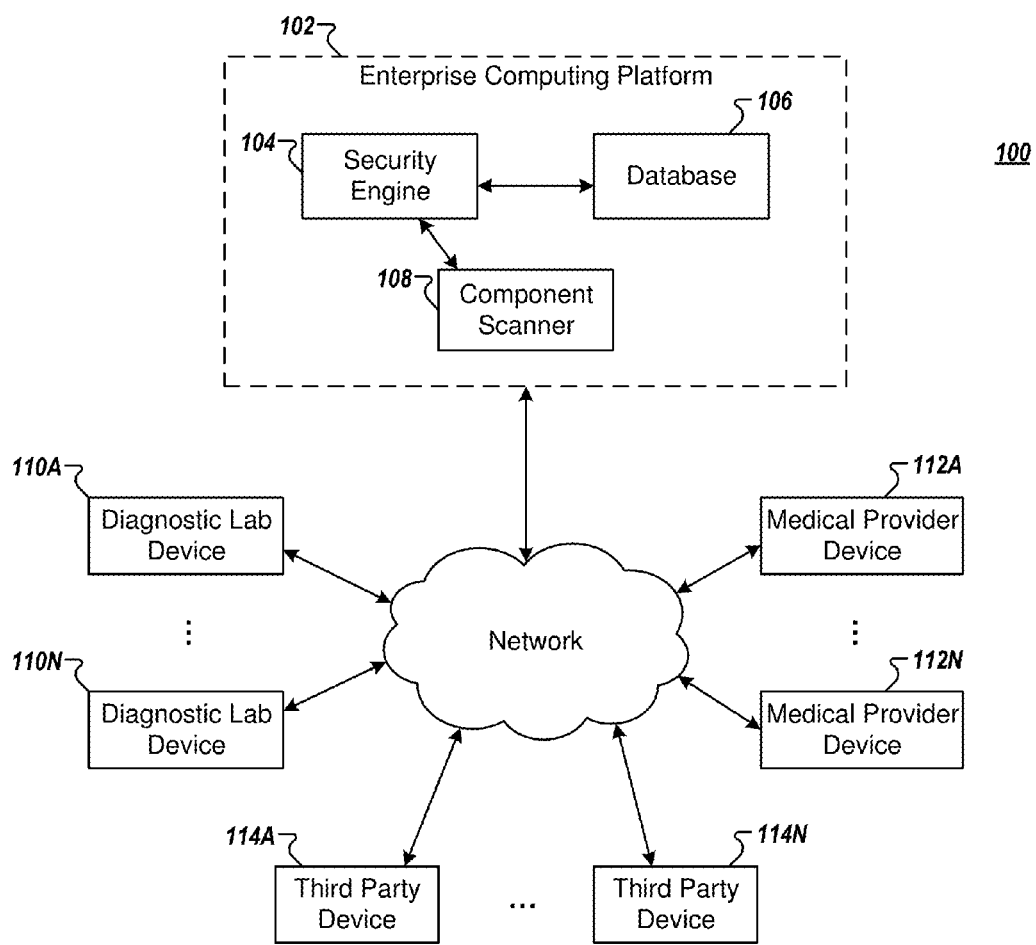

FIG. 1 shows an example system diagram, in accordance with an example embodiment of the present invention.

Figure 2:
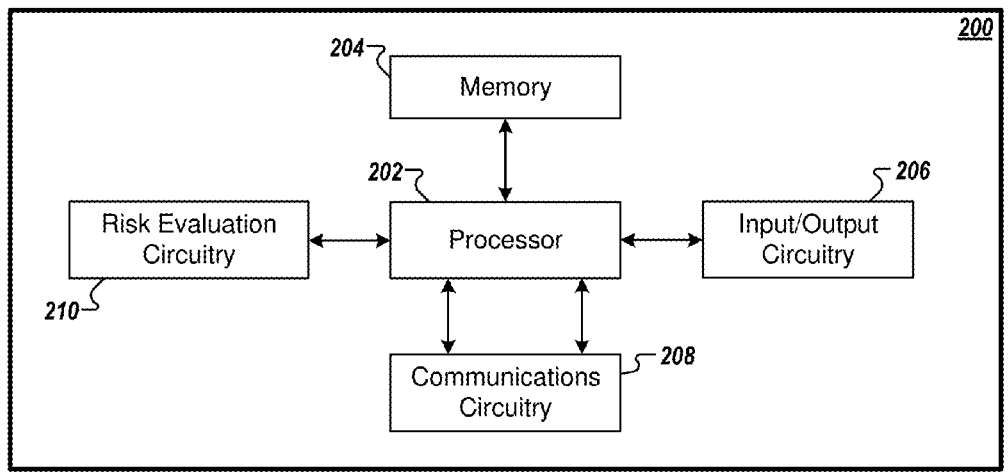

FIG. 2 illustrates a schematic block diagram of circuitry used in association with a security engine of an enterprise computing platform, in accordance with some example embodiments.

Figure 3:
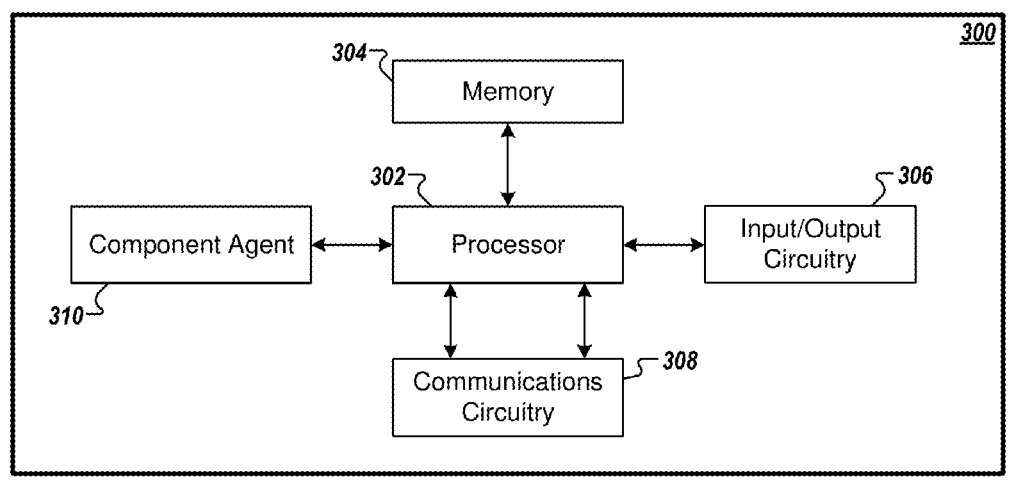

FIG. 3 illustrates a schematic block diagram of circuitry used in association with a device hosting or otherwise representing an asset with which the enterprise computing platform interacts, in accordance with some example embodiments.

Figure 4:
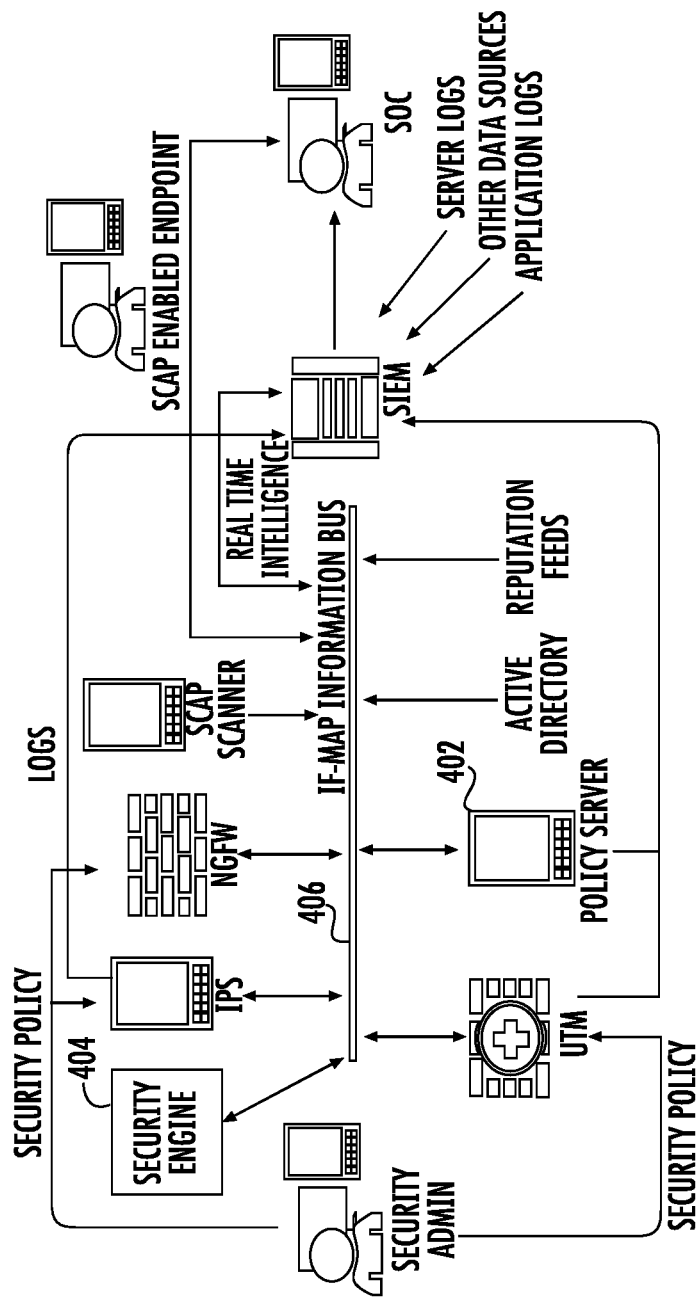

FIG. 4 illustrates a high level design of the security engine, in accordance with some example embodiments.

Figure 5:
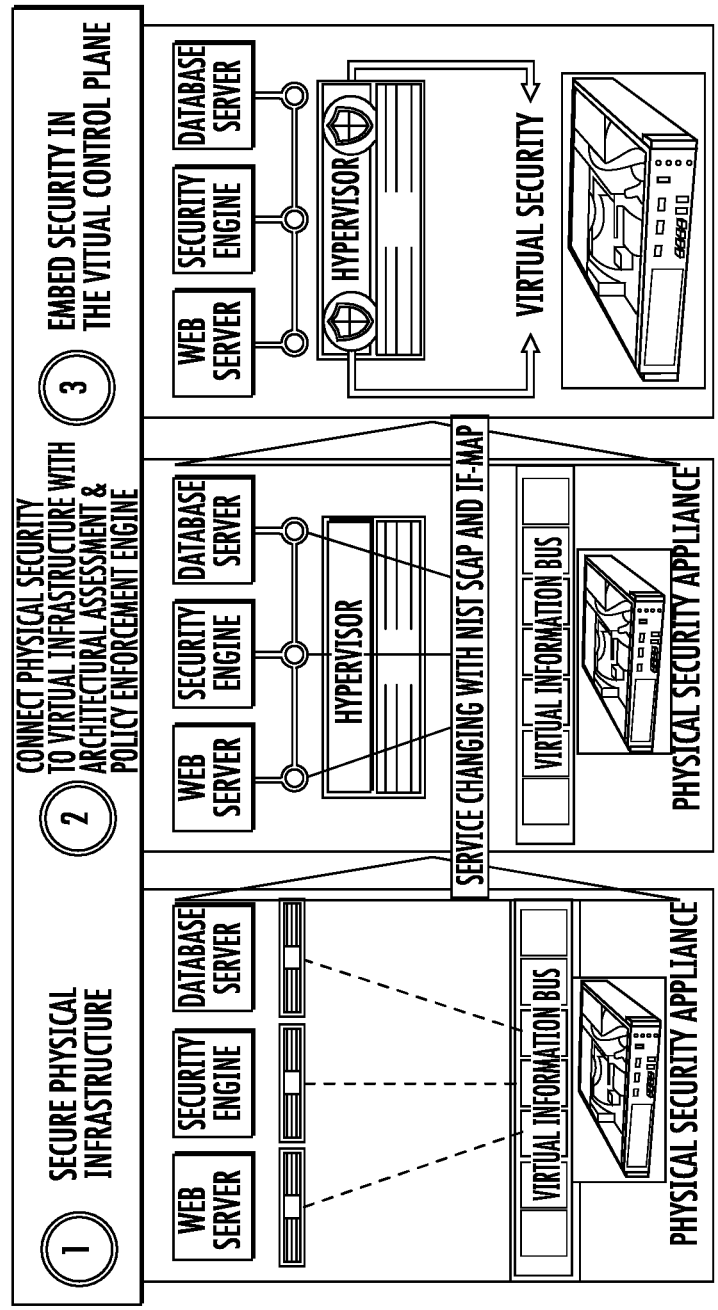

FIG. 5 illustrates a system level design of the security engine, in accordance with some example embodiments.

Figure 6:
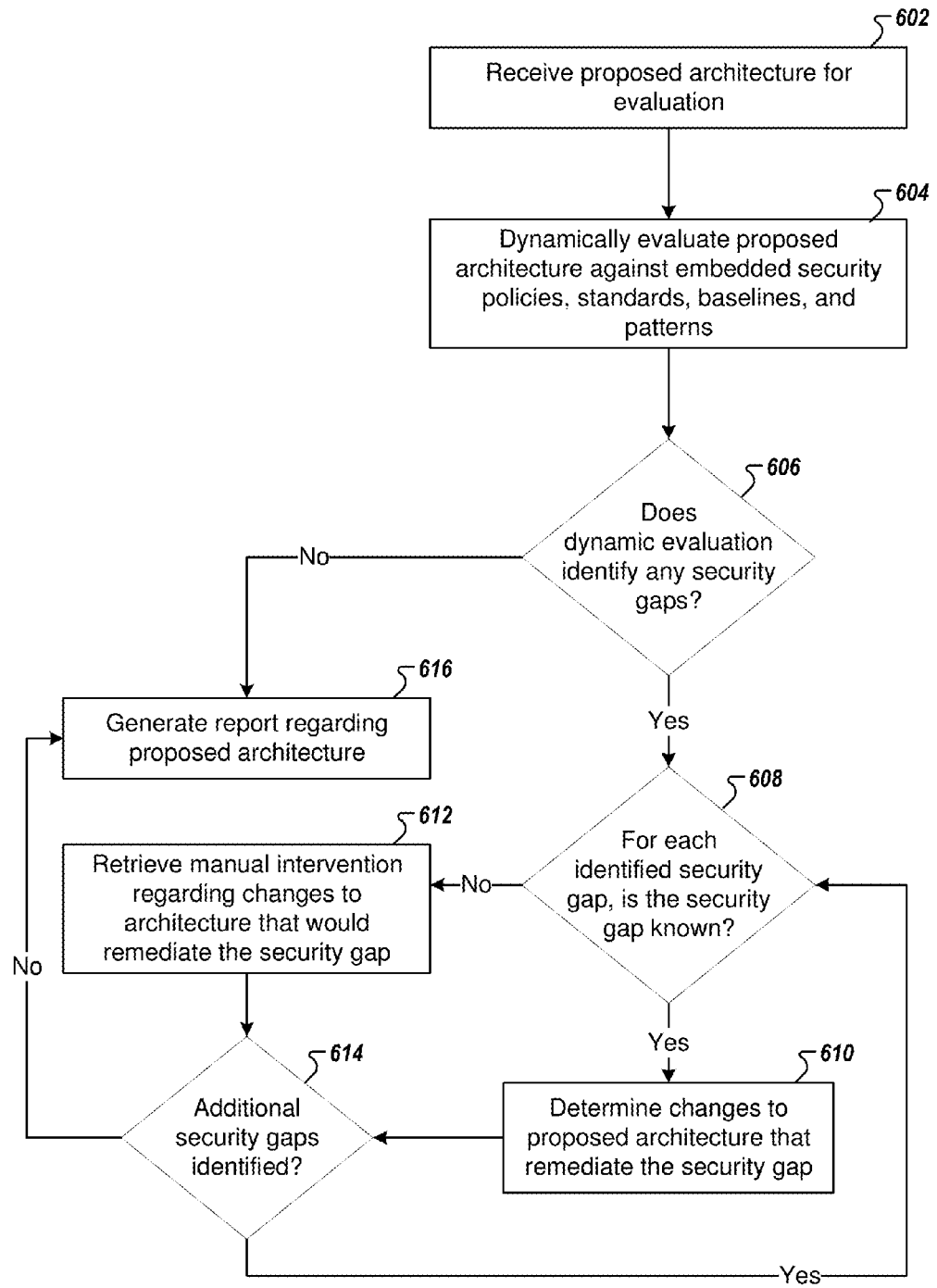

FIG. 6 illustrates a flowchart describing example operations for reducing security risk through automated assessment of applications and enforcement of security policies, in accordance with some example embodiments.

Figure 7:
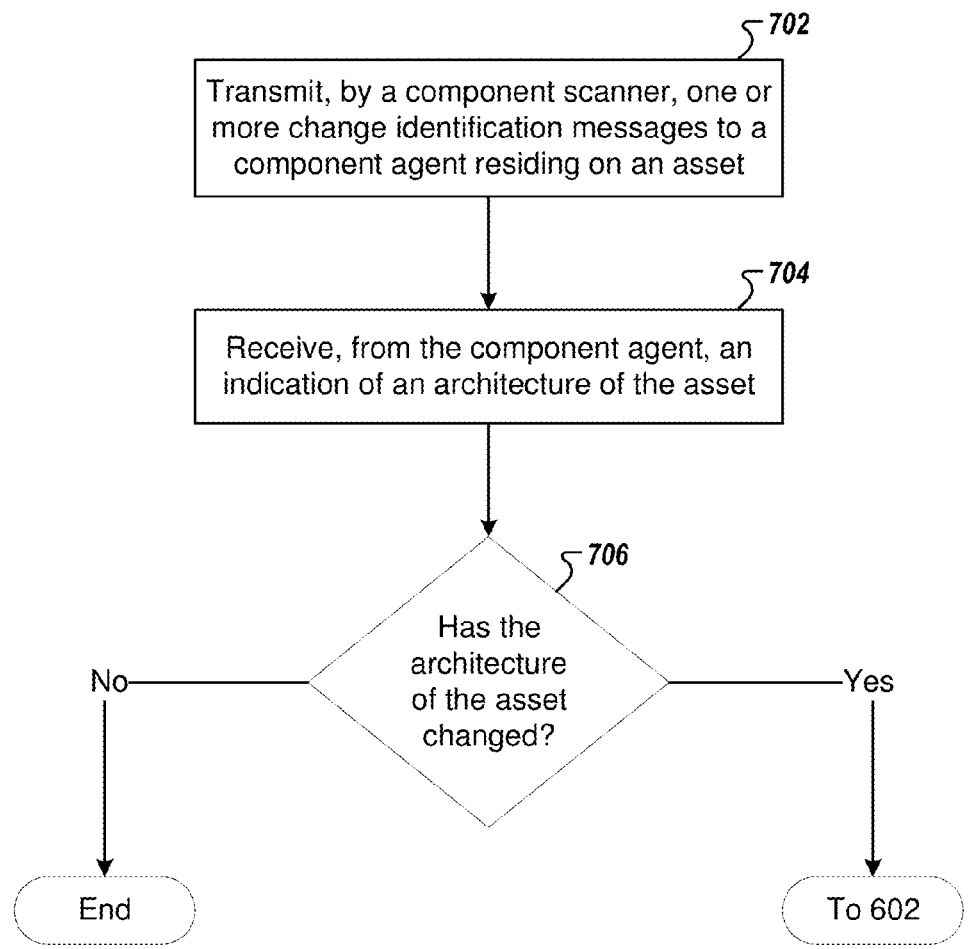

FIG. 7 illustrates a flowchart describing example operations for ensuring that already evaluated assets that change do not introduce new security gaps, in accordance with some example embodiments.

DETAILED DESCRIPTION

Various embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Overview

Historically, security gaps in enterprise computing platforms have been viewed as an unfortunate side effect caused by the constant need for interaction between enterprise computing platforms and externally sourced resources (e.g., applications, infrastructure elements, databases, or the like). However, protecting the security of such interactions is particularly important when those externally sourced resources are intended to access sensitive data such as Protected Health Information (PHI), Personally Identifiable Information (PII), or Payment Card Information (PCI) information. Such protected or classified compute resources, hereinafter referred to as "assets," thus require additional information security controls to protect the data that they utilize, and this is particularly true when that data is retrieved from the enterprise computing platform itself. While enterprise computing platforms are often managed by information technology (IT) groups who can evaluate risk profiles for assets and identify security gaps, the time and resources required to manually perform these functions is substantial.

Moreover, a significant source of security gaps in many enterprise computing platforms arises from the fact that an update to an already authorized asset does not prompt the same degree of alarm or scrutiny as a request to interface with a new asset, even though modifications of assets can present just as many security flaws. This lack of scrutiny has many causes. First, and as a practical matter, changes to assets are not always detected, so the emergence of new security gaps in security may be unknown to the enterprise. And second, due to the large time and resource investment inherent in the evaluation of security issues posed by any asset, changes to assets over time have historically been less policed than assets that are being newly introduced as a simple matter of triage. Accordingly, a need exists for a system that can facilitate compliance with the security policies governing interaction with a given enterprise computing platform and which at the same time can expedite the evaluation of both new and modified assets.

As described herein, example systems and apparatuses solve both these needs and others by providing a security engine configured to automatically evaluate assets for compliance with the security policies of an enterprise computing platform. In some embodiments, the security engine utilizes machine learning techniques that facilitate the preprocessing and classification of security policy related information regarding assets, and the subsequent prediction of continuous variables (statistical regression) and dimension reduction (reducing irrelevant variables) to identify. By doing so, example embodiments introduce greater rigor to security analysis, thus ensuring better protection of the enterprise computing platform against potential attacks that may otherwise take advantage of security gaps.

Moreover, by requiring installation of a component agent on assets that have been authorized to interact with an enterprise computing platform, and by introducing the use of a component scanner configured to communicate with the component agent, changes to assets already authorized to interface with the enterprise computing platform can be rigorously identified and evaluated, thereby unlocking the opportunity to evaluate the ongoing security profile of assets as they evolve over time. In conjunction, these concepts illustrate a configuration of an enterprise computing platform enabling the automated assessment of new assets and changing assets, mitigating two historical points of weakness in enterprise computing platform security assessment.

As described in greater detail below, various embodiments described herein improve upon existing asset assessment and security policy enforcement techniques. The embodiments described herein are directed to improvements in the technical character, ability, and efficiency of an enterprise computing platform.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Various assets may desire access and to an enterprise computing platform 102 via a network (e.g., the Internet, or the like) using computing devices 110A through 110N, 112A through 112N, and 114A through 114N, respectively.

The computing devices 110A through 110N, 112A through 112N, and 114A through 114N may be embodied by any computing devices known in the art. Electronic data received by the enterprise computing platform 102 from the diagnostic laboratory devices 110A-110N, medical provider devices 112A-112N, and third party devices 114A-114N may be provided in various forms and via various methods. For example, these devices may include desktop computers, laptop computers, smartphones, netbooks, tablet computers, wearable devices, and/or any combination of devices or entities adapted to perform the functions, operations, and/or processes described herein, and the electronic data may be provided using various transmission modes and/or protocols associated with these devices.

Additionally or alternatively, the diagnostic laboratories, medical providers, and other third parties may interact with the enterprise computing platform 102 via a web browser. As yet another example, the devices 110A-110N, 112A-112N, and 114A-114N may include various hardware or firmware designed to interface with the lab extraction computing system 102 (e.g., where an example device 110, 112, or 114 is a purpose-built device offered for the primary purpose of communicating with the enterprise computing platform 102, such as a kiosk).

The enterprise computing platform 102 may comprise a security engine 104 that may be in communication with a database 106 and a component scanner 108. The security engine 104 may be embodied as a computer or computers as known in the art. The security engine 104 may receive electronic data from various sources, including but not necessarily limited to the devices 110A-110N, 112A-112N, and 114A-114N and may be operable to analyze assets represented provided and/or represented by these devices.

The database 106 may be embodied as a data storage device such as a Network Attached Storage (NAS) device or devices, or as a separate database server or servers. The database 106 includes information accessed and stored by the security engine 104 to facilitate the operations of the enterprise computing platform 102. For example, the database 106 may include, without limitation: one or more security policies, standards, baselines, and/or patterns established for the enterprise computing platform 102. In this regard, a security policy is a broad sweeping document that provides security guidance from a business and technology perspective on a matter, while a standard is more granular and typically more technical document containing details that are often too specific to contain in the broader security policy. A baseline refers to a series of instructions or requirements that must be met before a technology is allowed into the enterprise. Accordingly, as described in greater detail below, the enterprise computing platform 102 includes components (e.g., security engine 104 and component scanner 108) to ingest design requirements corresponding to assets under evaluation (both functional and non-functional) and map those requirements and the technology being evaluated based on its compliance with said policies, standards, baselines, and patterns in order to determine whether there exist any security gaps that could introduce risk into the enterprise. Beyond these security policies, standards, baselines, and patterns, however, the database 106 may store other information, such as security-related data/protection suites for the database and/or application program interface (API) integration hooks.

Finally, the component scanner 108 may comprise a resource facilitating indirect communication between the security engine 104 and one or more component agents installed on assets with which the enterprise computing platform 102 may interact. By avoiding direct communication between component agents and the security engine 104 itself, the component scanner 108 provides an additional layer of protection to the enterprise computing platform 102. In this regard, the component scanner 108 may provide benefits similar to those provided by a bastion host, because even if the component scanner 108 is compromised due as a result of its interactions with an asset via a corresponding component agent hosted by a particular asset, the component scanner 108 itself does not store or provide access to any sensitive information, and security of the enterprise computing platform 102 may be maintained despite the compromise.

It will be understood that while the component scanner 108 enables retrieval of data from component agents hosted by various assets (e.g., providing information to the security engine 104 facilitated analysis of the risk profile of interfacing with the asset), this communication can be bidirectional, and the security agent 104 may transmit information back to the asset via the component scanner 108 and the asset's component agent (such transmissions may include indications of changes needed for continued interoperability with the enterprise computing platform 102).

The component scanner 108 provides an additional function as well. It is configured to determine differences between proposals from an asset (which are provided by that asset's component agent) to identify whether renewed evaluation of the risk profile of the asset is warranted. By doing so, the component scanner 108 provides the enterprise computing platform 102 with the ability to avoid the development of gaps in security despite the fact that the feature sets provided by assets evolve continually over time.

Example Apparatus for Implementing Embodiments of the Present Invention

The security engine 104 may be embodied by one or more computing devices, such as apparatus 200 shown in FIG. 2. As illustrated in FIG. 2, the apparatus 200 may include a processor 202, a memory 204, input/output circuitry 206, communications circuitry 208, and risk evaluation circuitry 210. The apparatus 200 may be configured to execute the operations described above with respect to FIG. 1 and below with respect to FIG. 7. Although these components 202-210 are described with respect to functional limitations, it should be understood that the particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments it may also include software for configuring the hardware. In some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

The processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to a user and, in some embodiments, to receive an indication of user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Risk evaluation circuitry 210 includes hardware configured to implement the security engine 104. Accordingly risk evaluation circuitry 210 is designed to analyze information regarding an asset and identify security gaps for potential remediation. In this regard, the risk evaluation circuitry 210 may utilize machine learning to evaluate the architecture of an asset against the security policies, standards, baselines, or patterns established for the enterprise computing platform 102 in order to identify security gaps. To do this, risk evaluation circuitry 210 includes a machine learning and or artificial intelligence component designed to capture security gaps based on understanding the proposed architecture and any outliers within this proposed architecture based, for instance, on a baseline that the risk evaluation circuitry 210 itself develops over time using training data. The risk evaluation circuitry 210 is therefore configured to use interpretive analysis and analytics to determine if there are any false positives to heal broken architectures that are out of compliance to policy, standards or baselines that would be housed within the logic as reference points and updated as those policies, standards and baselines are revised in the enterprise.

Risk evaluation circuitry 210 may utilize processing circuitry, such as the processor 202, to perform the above operations, and may utilize memory 204 to store the generated results of each risk evaluation. It should also be appreciated that, in some embodiments, the risk evaluation circuitry 210 may include a separate processor, specially configured field programmable gate array (FPGA), or application specific interface circuit (ASIC) to perform its functions. The risk evaluation circuitry 210 is therefore implemented using hardware components of the apparatus which in turn are configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

FIG. 3 illustrates a schematic block diagram of circuitry used in association with a device hosting or otherwise representing an asset with which the enterprise computing platform interacts, in accordance with some example embodiments. As illustrated in FIG. 3, the apparatus 300 may include a processor 302, a memory 304, an input/output circuitry 306, and communications circuitry 308. As it relates to operations described in the present invention, the functioning of these components may be similar to the similarly named components described above with respect to FIG. 2, and for the sake of brevity, additional description of the mechanics of these components is omitted. Nevertheless, these device elements, operating together, provide the apparatus 300 with the functionality necessary to facilitate the interaction between a given asset and the enterprise computing platform 102.

In addition, however, each apparatus 300 may further include a component agent 310 comprising hardware configured to interact with the component scanner 108. The component agent 310 made be temporal in nature, residing on the asset to allow communication updates from the platform to the other solution components should a change take place in the asset architecture as determined by the scanner and reported to the security engine. The component agent 310 may comprise a lightweight and unobtrusive component stored on the asset. It should be appreciated that, in some embodiments, the component agent 310 may comprise a hardware module including a separate processor, specially configured field programmable gate array (FPGA), or application specific interface circuit (ASIC) to perform these functions. In some embodiments, component agent 310 is therefore implemented using hardware components of the apparatus configured by either hardware or software for implementing these planned functions, although it should be understood that in some embodiments, component agent 310 may be configured entirely in software and may execute by utilizing the previously described components of the apparatus 300.

As described above and as will be appreciated based on this disclosure, example embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Security Automation Architecture

Having described the circuitry comprising some example embodiments contemplated herein, it should be understood that the enterprise computing platform 102 may advantageously evaluate the architecture of assets in association with security policies of the enterprise computing platform 102. In accordance with example embodiments, FIGS. 4 through 6 illustrate a high-level system design, a contextual component design, and a system-level design, respectively.

Turning first to FIG. 4, a high level system design is provided for evaluating the architecture of assets in association with security policies, standards, baselines, and patterns of the enterprise computing platform 102 (hosted by policy server 402). [As shown in FIG. 4, the system design relies on the use of TCG/TNC working group & NIST-industry standard architecture and protocols such as Secure Content Automation Protocol-NIST 800-117 (SCAP) that provide a protocol vocabulary for communication regarding asset security. A security engine 404—which relies upon machine learning artificial intelligence—may be embedded into the control plane of the solution, and may communicate with the various other elements in the enterprise computing platform 102 via IF-MAP bus 406. The artificial intelligence employed by the security engine 404 may in some embodiments be based upon sci-kit learn in Python. This would aid in pre-processing, data classification-ID, regression-predicting continuous variables and dimensionality reduction-reducing random variables considered. In other embodiments, Oryx may be used for machine learning (ML)/AI, as it may be possible to leverage their lambda architecture and built upon H20 on Hadoop with HDFS at the computation layer interacting with the service layer and the bus. Finally, although not shown in FIG. 4, a SCAP enabled endpoint/asset may interface with the enterprise computing platform 102 using the above-referenced component agent 310 to allow for constant communications with the platform and the IF-MAP bus 404 using the IF-MAP open protocol. The security policies, standards, and baselines stored on the policy server 402 can therefore be referenced to determine and heal security gaps to reduce risk and improve the proposed architectures being evaluated by the platform.

While FIG. 4 provides a high level design, it will be understood that a contextual component design (CCD) of an example enterprise computing platform 102 may often be segmented in various "zones" having different access rights and operational roles. Typically, an enterprise will provide segmentation and isolation of the zones within its architecture to prevent access from a low security zone to a high security zone. The arrangement and architecture of these zones may be customized as requirements are determined for each particular enterprise architecture based on where the assets reside. Accordingly, the security engine 104 may sit in a "presentation layer zone" that allows for easy access and communication with external assets, thus facilitating near-real-time assessment based on business and technical requirements. Alternatively, the security engine 104 may be located in deeper zone within the enterprise architecture, thus provide greater security from external sources. The component scanner may also be located in the presentation zone to facilitate interaction with assets at a distinct layer from core operational components of the enterprise computing platform 102 to enhance the security of the platform 102 as a whole. The component agent would correspondingly reside on critical information assets communicating with the component scanner to determine if changes have been made outside of current policy, patterns, standards, and baselines of the enterprise computing platform 102. It should be understood that the security engine also contains a database and web server component, as shown in FIG. 4, using which all communications into and out of the security engine are secured and reported upon.

FIG. 5, in turn, illustrates a system level design of the security engine. The physical infrastructure utilized by the security engine includes a web server and a database server. The web server may comprise a hardened apache server while the database server may have a hardened NoSQL design. The security engine itself may be implemented using SE Linux or Slackware, and in some embodiments the only exterior exposure of the security engine is via a RESTful API. The security engine may communicate via a services bus (e.g., the virtual information bus shown in FIG. 5). The security engine may utilize IF-MAP standards-based security protocols to enable automation and reporting regarding asset analysis updates within particular zones. Similarly, by utilizing SCAP and XCCDF protocols for extensible checklist enabling determination of settings, warnings, user guidance, and metadata. On the security engine is a content/configuration management database running CMDB, which may essentially function as a light data warehouse for the technology architectures, and hold referenced dependency related date for the assets that would be accessed on an as needed basis by the other components. Although the SCAP and XCCDF protocols provide the ability to report and automate the analysis of assets, a machine learning component of the security engine is configured to perform functions comprising the "intelligence" that allows production of analytics and AI to actually perform evaluation. As described in greater detail below, the inputs for the machine learning/AI component would be a signature reference, an anomaly determined as an outlier to said signature, a manual input related to a known training set of data such as a policy, standard, and baseline or technology pattern. The system trains by looking for variants of the input data set or training data set to determine a baseline or pattern. The output would be machine-learned as a result of said baseline. An example would be using a decision tree, support vector, or via cross-validation of the training data set to determine that an input architecture or component is out of compliance with a baseline embedded in the system.

Example Operations Performed for Reducing Security Risk

Turning now to FIG. 6, the provided flowchart illustrates a sequence of operations for reducing security risk through automated assessment of applications and enforcement of security policies. As noted previously, these operations may be performed by an enterprise computing platform 102, with the assistance of, and/or under the control of a computing device such as apparatus 200. In this regard, the apparatus 200 hosts the security engine 104 and thus comprises the device implementing the functionality of security engine 104.

In operation 602, apparatus 200 includes means, such as input/output circuitry 206, communications circuitry 208, or the like, for receiving a proposed architecture for evaluation. Each received proposed architecture corresponds to an asset designed for interfacing with the enterprise computing platform 102. The proposed architecture may comprise a document having any format capable of describing the proposed architecture of the enterprise computing platform 102 upon interfacing with the asset (e.g., the document may comprise a Visio diagram (.vsd), a Word document (.doc), an excel spreadsheet (.xls), a PowerPoint presentation (ppt), or the like, or even raw data). The proposed architecture received may include high level and system level designs plus functional and non-functional architectural requirements for integrating the asset into the enterprise computing platform 102.

In operation 604, apparatus 200 includes means, such as risk evaluation circuitry 210, or the like, for dynamically evaluating the proposed architecture against embedded enterprise security policies, standards, baselines, and/or patterns. This operation may be performed using one or more machine learning algorithms enabling interpretation of the proposal for security evaluation. In some embodiments, this operation may be performed by the risk evaluation circuitry 210 implementing functionality of the security engine 104. The machine learning algorithms may utilize supervised learning, unsupervised learning, regressive algorithms (e.g., predictions that can be made based on a model, e.g., instance based algorithms and decision-tree algorithms, or Bayesian algorithms), association rule learning algorithms (ARLA) (such as Apriori, Eclat, or the like), deep learning or artificial neural network algorithms (back propagation, RBFN).

In operation 606, the apparatus 200 includes means, such as risk evaluation circuitry 210 or the like, for determining whether the dynamic evaluation of the proposed architecture contains any security gaps that may violate the security policies, standards, baselines, or patterns established for the enterprise computing platform 102. In this regard, a security gap comprises either an aspect of the proposed architecture that is known to be out of compliance with the security policies, standards, baselines, or patterns of enterprise computing platform 102 or an aspect of the proposed architecture for which the security engine 104 (as implemented by the risk evaluation circuitry 210) is unable to determine compliance status. In an instance in which one or more security gaps are identified, the procedure advances to operation 608. However, if no security gaps are identified, the procedure advances directly to operation 616 for generation of a report regarding the proposed architecture.

In operation 608, the apparatus 200 includes means, such as risk evaluation circuitry 210 or the like, for determining, for each security gap identified, whether the security gap is known to be out of compliance or for which its compliance status is unable to be determined by the security engine 104. If the security gap is known to be out of compliance, the procedure advances to operation 610 to determine possible changes that might remediate the security gap. If the security gap is status is unable to be determined, the procedure advances to operation 612 to request manual intervention.

Turning next to operation 610, the apparatus 200 includes means, such as risk evaluation circuitry 210 or the like, for determining changes to the proposed architecture that would remediate the security gap. In this regard, when the security engine 104 is able to identify an out-of-compliance security gap, this identification stems from the ability of the security engine 104 to identify a particular portion of a security policy, standard, baseline, or pattern that is violated. Accordingly, determining changes to the proposed architecture that would remediate the security gap may in some embodiments reference the violated policy, standard, baseline, or pattern and identify the nature of the violation and (by extension) the manner by which the violation could be corrected. In this regard, security gap non-compliance may be determined by the inputs (e.g., the data training set) used to generate the policies, standards, baselines and patterns for the enterprise, or anomaly, signature set, and baseline-related data identifying normal or allowed architectures for the enterprise. This operation may thus be performed in real-time or near-real-time, rather than in a batch or delayed process as would be required to implement a similar feature manually.

As noted previously, however, it may not always be the case that the security engine 104 is able to diagnose each identified security gap. In such instances where diagnosis is not possible, the procedure advances from operation 608 to operation 612. In operation 612, the apparatus 200 includes means, such as input/output circuitry 206, communications circuitry 208, or the like, for retrieving manual intervention regarding the changes to the proposed architecture that would remediate the undiagnosed security gap. Retrieval of manual intervention may include transmission of a request for manual intervention followed be receipt of a response to the request from a user. These data transmissions may be made via input/output circuitry 206 of the apparatus 200 or via communications circuitry 208, if the user provides the response from a separate terminal. One aspect of a machine learning system that benefits from this operation is that user diagnosis of each otherwise undiagnosed security gap will itself comprise a training input that can thereafter be used by the security engine 104 to diagnose similar aspects of proposed architecture prospectively. In this fashion, while manual intervention may be more common upon initial utilization of the security engine 104, over time it will become less and less necessary as the machine learning components generate larger sets of training data that can be mined to diagnose all aspects of later-proposed architectures.

In operation 614, the apparatus 200 includes means, such as processor 202, memory 204, risk evaluation circuitry 210, or the like, for determining whether additional security gaps have been identified, and if so, the procedure returns to operation 608 for processing of the remainder of the identified security gaps. If not, however, the procedure advances to operation 616 for generation of a report regarding the proposed architecture.

Finally, in operation 616, the apparatus 200 includes means, such as communications circuitry 208 or the like, for generating a report regarding the proposed architecture. In this regard, the report may comprise a document describing any security gaps identified during the evaluation of the proposed architecture and indicating what changes to the proposed architecture may be necessary to remediate those security gaps. In some embodiments, however, the report may comprise a series of documents (e.g., one for each identified security gap). In yet other embodiments, the report may not comprise a single document, but a data stream that can be stored by a receiving component (for instance, the security engine 104 may transmit these changes in sequential fashion to the component scanner 108. In an instance in which no security gaps were identified, the report may indicate that the proposed architecture has been validated, and in this case, after this process completes, the proposed architecture and its corresponding asset(s) would be determined as compliant and require no remediation, allowing this solution to be integrated by continuously monitored in the enterprise architecture]

If the proposed architecture represents a change to an asset that has previously been validated, the apparatus 200 may cause transmission of the report to a component agent 310 residing on the asset that has changed. As noted above, if the changes to the proposed architecture needed to remediate the security gap are sequentially transmitted to the component scanner 108, the component scanner 108 may itself collate the changes into a report for delivery to the component agent 310 or may relay the changes in sequential fashion to the component agent 310 residing on the asset to which the proposed architecture relates.

Turning now to FIG. 7, a flowchart is provided that illustrates a sequence of operations for ensuring that already evaluated assets that change do not introduce new security gaps. These operations may be performed by an enterprise computing platform 102 which may, for instance, comprise an apparatus 200. In some embodiments, the apparatus 200 implements the security engine 104 and in addition implements the component scanner 108. In this case, even though the same apparatus 200 implements both the security engine 104 and the component scanner 108, it should be understood that these two components may be distinct operative elements executed by the apparatus rather than being parts of a single application. It should be understood, though, that in some other embodiments, the apparatus 200 implements the security engine 104 but does not implement the component scanner 108, and instead is in operative communication with a separate apparatus that implements the component scanner 108. In any embodiment, the component scanner 108, in turn, is in communication with a component agent 310 residing on an asset.

In operation 702, the apparatus 200 may include means, such as communications circuitry 208, risk evaluation circuitry 210, or the like, for causing transmission, by a component scanner, of one or more change identification messages to a component agent residing on an asset. In an instance in which the apparatus 200 embodies the component scanner as well as the security engine, this operation may include transmitting the change identification message to the component agent directly. Of course, in an instance in which the apparatus 200 does not itself embody the component scanner, this operation may include transmitting a message to the component scanner instructing the component scanner to in turn transmit the change identification message to the component agent.

In operation 704, the apparatus 200 may include means, such as processor 202, communications circuitry 208, risk evaluation circuitry 210, or the like, for receiving, from the component agent, an indication of an architecture of the asset. As with operation 702 above, the particular sub-steps taken in operation 704 may be different depending on whether the apparatus 200 itself embodies the component scanner or not.

In an instance in which the apparatus 200 embodies the component scanner as well as the security engine, operation 704 includes receiving a message from the component agent describing the asset architecture and further includes evaluating the asset architecture to identify changes to the asset architecture from the version of the architecture that had previously been evaluated by the security engine.

Alternatively, in an instance in which the apparatus 200 does not itself embody the component scanner, the component scanner may receive the message describing the architecture from the component agent and may identify any changes to the asset architecture from the version of the architecture that had previously been evaluated. In this case, in operation 704, the apparatus 200 may simply receive an indication from the component scanner of whether there have been any changes to the asset architecture from the version of the architecture that was previously evaluated by the security engine.

As indicated by operation 706, in an instance in which the asset architecture has changed, the procedure moves to operation 602 to begin a new evaluation of the changed architecture to ensure no security gaps have been introduced by the change. Alternatively, in an instance in which the asset architecture has not change, no further action need be performed and the procedure may end.

Examples Regarding Evaluation of New or Changed Assets

The following scenarios illustrate example operations that may occur when a user wishes to integrate a new asset into the enterprise computing platform 102. In the following examples, the asset comprises a new software module that allows transmission of PHI, PII, or PCI data between the enterprise computing platform 102 and a user's mobile device (e.g., elements 110, 112, or 114 in FIG. 1). For the first two examples, it will be assumed that a security policy of the enterprise computing platform 102 includes a prohibition against unencrypted transmission of PHI, PII, or PCY data.

In the first example, the proposed architecture incorporating the new asset facilitates unencrypted transmission of PCI data between the enterprise computing platform 102 and the user's mobile device. In operation 602, a user generates and submits a proposed architecture including this asset for evaluation by the enterprise computing platform 102. In operation 604, the security engine dynamically evaluates the proposed architecture against the embedded security policies, standards, baselines, and patterns of the enterprise computing platform 102. At operation 606, the enterprise computing platform 102 identifies a security gap: the proposed architecture would facilitate unencrypted PCI data transmission. Accordingly, the procedure advances to operation 608, for determination of whether this security gap is known. It is, so the procedure advances to operation 610 to identify what changes may remediate this security gap. In operation 610, the enterprise computing platform 102 determines that a change to the proposed architecture requiring encrypted transmission of PCI data would remediate the problem and enable use of the asset with the enterprise computing platform 102. Because this is the only security gap identified in this example, the procedure advances through operation 614 to operation 616, to generate a report to the user indicating that the PCI data transmission must be encrypted for the asset to be used with the enterprise computing platform 102.

In a second example, a proposed architecture incorporating the new asset facilitates encrypted transmission of this data between the enterprise computing platform 102 and the user's mobile device. Here, as in the first example, in operation 602, a user generates and submits a proposed architecture including this asset for evaluation by the enterprise computing platform 102. Also similar to the first example, in operation 604, the security engine dynamically evaluates the proposed architecture against the embedded security policies, standards, baselines, and patterns of the enterprise computing platform 102. However, at operation 606, the enterprise computing platform 102 does not identify a security gap: because in this example the proposed architecture uses encrypted PCI data transmission, there is no problem with the proposal. Accordingly, the procedure advances directly to operation 616 to generate a report to the user indicating that the asset is validated and may be utilized with the enterprise computing platform 102.

In a third example, a proposed architecture incorporating the asset facilitates encrypted transmission of PCI data between the enterprise computing platform 102 and the user's mobile device, but uses a type of encryption that is not identified in the security policies, standards, baselines, or patterns of the enterprise computing platform 102. As with the first two examples, in operation 602, a user generates and submits a proposed architecture including this asset for evaluation by the enterprise computing platform 102. In operation 604, the security engine dynamically evaluates the proposed architecture against the embedded security policies, standards, baselines, and patterns of the enterprise computing platform 102. At operation 606, the enterprise computing platform 102 identifies a security gap: the proposed architecture would facilitate encrypted PCI data transmission, but the encryption protocol is unrecognized. Accordingly, the procedure advances to operation 608, for determination of whether this security gap is known. Because the encryption protocol is unrecognized, the security gap is not known, and the procedure advances to operation 612 to acquire manual intervention. In operation 612, the manual intervention may indicate one of two things: either the encryption protocol is adequately secure (in which case there is not a security gap), or the encryption protocol is not sufficiently secure and the proposed architecture does include a security gap after all.

In the latter case, the manual intervention will thus provide both the confirmation of a security gap and identify the changes to the architecture that would remediate the security gap (a proposal of an alternative encryption scheme). Regardless of whether the manual intervention confirms the existence of a security gap or not, this is the only security gap identified in this example, and the procedure advances through operation 614 to operation 616, to generate a report to the user. If there is no security gap, then the report validates the asset for use with the enterprise computing platform 102. However, if there remains a security gap, then the report indicates the change necessary to the encryption scheme to enable the PCI data transmission to be used with the enterprise computing platform 102. Either way, the manual intervention represents another training data point that is thereafter ingested by the security engine 104 for use during dynamic evaluation of future proposed architectures.

Finally, in a fourth example, the asset has been validated previously when it facilitated encrypted transmission of sensitive data between the enterprise computing platform 102 and the user's mobile device, but a change to the architecture of the asset would enable the unencrypted transmission of some types of PCI data. As an initial matter, when an asset is validated and used in connection with the enterprise computing platform 102, example embodiments described herein may mandate that the asset, when used, have a component agent 310 stored thereon to facilitate communication between the asset and a component scanner 108 residing within the enterprise computing platform 102 and in communication with the security engine 104. Accordingly, the following procedure would be performed. First, in operation 702, the component scanner 108 would transmit a change identification message to the component agent 310 residing on the asset. In response, the component agent 310 transmits an indication of the architecture of the asset. In operation 706, the component scanner 108 compares this current architecture against the architecture of the asset that was validated in the past and determines that there has been a change. Accordingly, the procedure advances to operation 602 in which the component scanner 108 submits the changed architecture to the security engine 104 for analysis.

Subsequently, in operation 604, the security engine dynamically evaluates the changed architecture against the embedded security policies, standards, baselines, and patterns of the enterprise computing platform 102. At operation 606, the enterprise computing platform 102 identifies a security gap: the changed architecture would facilitate unencrypted PCI data transmission. Accordingly, the procedure advances to operation 608, for determination of whether this security gap is known. It is, so the procedure advances to operation 610 to identify what changes may remediate this security gap. In operation 610, the enterprise computing platform 102 determines that a further change to the changed architecture requiring encrypted transmission of PCI data would remediate the problem and enable continued use of the asset with the enterprise computing platform 102. Because this is the only security gap identified in this example, the procedure advances through operation 614 to operation 616, to generate a report to the user indicating that the PCI data transmission must be encrypted for the asset to continue to be used with the enterprise computing platform 102.

As described above, example embodiments of the present invention enable improved security of an enterprise computing platform. Through implementation of an artificially intelligent security analysis system, example embodiments expedite the process of security gap identification, while at the same time improving both the consistency of security analysis and newly facilitating remediation of identified security gaps, both for new assets that may be introduced to the enterprise computing platform and existing assets that evolve over time.

FIGS. 6 and 7 illustrates flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

As described above, certain example embodiments of the present invention are directed to improved apparatuses, methods, and computer readable media for improving upon the technical character, ability, and efficiency of traditional computing devices. Through the use of data-based heuristics referenced above, embodiments described herein enable data extraction operations to ignore portions of lab reports containing irrelevant information. In this fashion, embodiments described herein provide improvements in efficiency that increase in the throughput of data extraction efforts, and enable the generation of more up-to-date sets of structured data for subsequent actuarial uses (among others).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for asset architecture evaluation and security enforcement within an enterprise computing platform, the method comprising:
   causing transmission, by a component scanner, of one or more change identification messages to a component agent residing on an asset that was previously evaluated by a security engine;
   receiving an indication that there have been changes to a current architecture of the asset;
   generating a proposed architecture for evaluation, wherein the proposed architecture for evaluation indicates a design including both the enterprise computing platform and a modified version of the architecture of the asset that is based on the changes to the current architecture of the asset;
   dynamically evaluating, by risk evaluation circuitry and in near-real-time using one or more machine learning algorithms, the proposed architecture against embedded security policies, standards, baselines, or patterns established for the enterprise computing platform;
   in an instance in which dynamic evaluation of the proposed architecture identifies security gaps, determining, by the risk evaluation circuitry, changes to the proposed architecture that would remediate the identified security gaps;
   generating a report regarding the proposed architecture, wherein the report identifies any changes to the proposed architecture that would remediate the identified security gaps; and
   causing transmission, by the component scanner and to the component agent residing on the asset, of the report regarding the proposed architecture.

2. The method of claim 1, wherein receiving the indication that there have been changes to the architecture includes:
   receiving an indication of an architecture of the asset; and
   comparing the architecture of the asset to a version of the architecture of the asset that was previously evaluated by the security engine.

3. The method of claim 1, further comprising:
   training the one or more machine learning algorithms to develop one or more baselines or patterns for the enterprise computing platform.

4. The method of claim 3, wherein dynamically evaluating the proposed architecture includes:
   evaluating, by the risk evaluation circuitry and using the one or more machine learning algorithms, whether any aspects of the proposed architecture violate the developed baselines or patterns for the enterprise computing platform.

5. The method of claim 1, wherein determining changes to the proposed architecture that would remediate the identified security gaps includes:
   retrieving manual intervention identifying the changes to the proposed architecture that would remediate the identified security gaps; or
   identifying the changes to the proposed architecture that would remediate the identified security gaps using at least one of the embedded security policies, standards, baselines, or patterns established for the enterprise computing platform.

6. An apparatus for asset architecture evaluation and security enforcement within an enterprise computing platform, the apparatus comprising at least one processor and at least one memory storing computer-executable instructions, that, when executed by the at least one processor, cause the apparatus to:
   cause transmission of one or more change identification messages to a component agent residing on an asset that was previously evaluated by a security engine;
   receive an indication that there have been changes to a current architecture of the asset;
   generate a proposed architecture for evaluation, wherein the proposed architecture for evaluation indicates a design including the enterprise computing platform and a modified version of the architecture of the asset that is based on the changes to the current architecture of the asset;

dynamically evaluate, in near-real-time using one or more machine learning algorithms, the proposed architecture against embedded security policies, standards, baselines, or patterns established for the enterprise computing platform;

in an instance in which dynamic evaluation of the proposed architecture identifies security gaps, determine changes to the proposed architecture that would remediate the identified security gaps;

generate a report regarding the proposed architecture, wherein the report identifies any changes to the proposed architecture that would remediate the identified security gaps; and cause transmission of the report regarding the proposed architecture to the component agent residing on the asset.

7. The apparatus of claim 6, wherein the computer-executable instructions, when executed by the at least one processor, causes the apparatus to receive the indication that there have been changes to the architecture by causing the apparatus to:

receive an indication of an architecture of the asset; and
compare the architecture of the asset to version of the architecture of the asset that was previously evaluated by the security engine.

8. The apparatus of claim 6, wherein the computer-executable instructions, when executed by the at least one processor, further cause the apparatus to:

train the one or more machine learning algorithms to develop one or more baselines or patterns for the enterprise computing platform.

9. The apparatus of claim 8, wherein the computer-executable instructions, when executed by the at least one processor, cause the apparatus to dynamically evaluate the proposed architecture by causing the apparatus to:

evaluate, using the one or more machine learning algorithms, whether any aspects of the proposed architecture violate the developed baselines or patterns for the enterprise computing platform.

10. The apparatus of claim 6, wherein the computer-executable instructions, when executed by the at least one processor, cause the apparatus to determine changes to the proposed architecture that would remediate the identified security gaps by causing the apparatus to:

retrieve manual intervention identifying the changes to the proposed architecture that would remediate the identified security gaps; or identify the changes to the proposed architecture that would remediate the identified security gaps using at least one of the embedded security policies, standards, baselines, or patterns established for the enterprise computing platform.

11. An apparatus for asset architecture evaluation and security enforcement within an enterprise computing platform, the apparatus comprising:

means for causing transmission of one or more change identification messages to a component agent residing on an asset that was previously evaluated by a security engine;

means for receiving an indication that there have been changes to a current architecture of the asset;

means for generating a proposed architecture for evaluation, wherein the proposed architecture for evaluation indicates a design including the enterprise computing platform and a modified version of the architecture of the asset that is based on the changes to the current architecture of the asset;

means for dynamically evaluating, in near-real-time using one or more machine learning algorithms, the proposed architecture against embedded security policies, standards, baselines, or patterns established for the enterprise computing platform;

means for, in an instance in which dynamic evaluation of the proposed architecture identifies security gaps, determining changes to the proposed architecture that would remediate the identified security gaps;

means for generating a report regarding the proposed architecture, wherein the report identifies any changes to the proposed architecture that would remediate the identified security gaps; and means for causing transmission of the report regarding the proposed architecture to the component agent residing on the asset.

12. The apparatus of claim 11, wherein the means for receiving the indication that there have been changes to the architecture include:

means for receiving an indication of an architecture of the asset; and means for comparing the architecture of the asset to a version of the architecture of the asset that was previously evaluated by the security engine.

13. The apparatus of claim 11, further comprising:

means for training the one or more machine learning algorithms to develop one or more baselines or patterns for the enterprise computing platform.

14. The apparatus of claim 13, wherein the means for dynamically evaluating the proposed architecture includes:

means for evaluating, using the one or more machine learning algorithms, whether any aspects of the proposed architecture violate the developed baselines or patterns for the enterprise computing platform.

15. The apparatus of claim 11, wherein the means for determining changes to the proposed architecture that would remediate the identified security gaps include:

means for retrieving manual intervention identifying the changes to the proposed architecture that would remediate the identified security gaps; or means for identifying the changes to the proposed architecture that would remediate the identified security gaps using at least one of the embedded security policies, standards, baselines, or patterns established for the enterprise computing platform.

* * * * *